United States Patent
Chang

(10) Patent No.: US 7,352,489 B2
(45) Date of Patent: Apr. 1, 2008

(54) COLOR ERROR DIFFUSION METHOD FOR MULTI-LEVEL OUTPUT DEVICE

(75) Inventor: Ching-Wei Chang, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 855 days.

(21) Appl. No.: 10/808,879

(22) Filed: Mar. 24, 2004

(65) Prior Publication Data

US 2005/0213121 A1 Sep. 29, 2005

(51) Int. Cl.
*H04N 1/52* (2006.01)
*H04N 1/58* (2006.01)
*H04N 1/60* (2006.01)
*G06K 9/00* (2006.01)

(52) U.S. Cl. .............. 358/1.9; 358/534; 358/3.03; 358/523; 358/3.26; 358/504; 382/252; 382/162

(58) Field of Classification Search ............ 358/1.9, 358/536, 518, 296, 298, 502, 533–535, 456–458, 358/3.19, 3.03, 523, 3.26, 504, 252; 345/612, 345/700; 382/166, 168, 162
See application file for complete search history.

(56) References Cited

U.S. PATENT DOCUMENTS

| | | | |
|---|---|---|---|
| 5,070,413 A | 12/1991 | Sullivan et al. | |
| 5,185,673 A * | 2/1993 | Sobol | ............ 358/296 |
| 5,621,545 A | 4/1997 | Motta et al. | |
| 5,621,546 A * | 4/1997 | Klassen et al. | ............ 358/536 |
| 5,726,772 A * | 3/1998 | Parker et al. | ............ 358/3.19 |
| 6,072,591 A | 6/2000 | Harrington | |
| 6,178,008 B1 | 1/2001 | Bockman et al. | |
| 6,271,936 B1 | 8/2001 | Yu et al. | |
| 6,483,606 B1 | 11/2002 | Klassen et al. | |
| 6,535,635 B1 | 3/2003 | Klassen et al. | |
| 2003/0146925 A1* | 8/2003 | Zhao et al. | ............ 345/700 |
| 2005/0041038 A1* | 2/2005 | Sanger | ............ 345/612 |

FOREIGN PATENT DOCUMENTS

JP  9-307776  11/1997

* cited by examiner

*Primary Examiner*—Kimberly A. Williams
*Assistant Examiner*—Charlotte M. Baker
(74) *Attorney, Agent, or Firm*—Jon M. Dickinson, PC; Robert D. Varitz, PC

(57) ABSTRACT

An improved color-image error diffusion process for use in conjunction with the operation of a multi-level, halftone, color-image output device. This process involves, first, performing output-device-dependent color error diffusion on color-image input data utilizing a halftone, output-device-dependent color palette containing output-device-dependent output color values. Thereafter, and with respect to the selection for pixel outputting of a pixel utilizing one of the output colors in the palette, and in relation to infeeding of that pixel to the output device for outputting, the process features applying a predetermined, dot-gain correction curve which corrects the infeed intensity value of the pixel in accordance with (a) the selected output color for the pixel, and (b) assessment of the pixel in terms of its association with a predetermined neighborhood pattern of adjacent pixels.

5 Claims, 3 Drawing Sheets

MEASURED

| | L | a* | b* |
|---|---|---|---|
| W | 255 | 0 | 0 |
| M | 121 | 71 | -27 |
| C | 135 | -22 | -47 |
| Y | 218 | -14 | 83 |
| C+M | 53 | 31 | -55 |
| M+Y | 108 | 58 | 43 |
| C+Y | 116 | -70 | 19 |
| C+M+Y | 43 | -10 | -1 |

IDEAL

| | L | a* | b* |
|---|---|---|---|
| W | 255 | 0 | 0 |
| M | 122 | 83 | -3 |
| C | 158 | -31 | -48 |
| Y | 240 | -14 | 100 |
| C+M | 46 | 39 | -52 |
| M+Y | 120 | 75 | 49 |
| C+Y | 140 | -79 | 36 |
| C+M+Y | 43 | 9 | -5 |

AVERAGED

| | L | a* | b* |
|---|---|---|---|
| W | 255 | 0 | 0 |
| M | 121 | 77 | -15 |
| C | 146 | -26 | -47 |
| Y | 229 | -14 | 91 |
| C+M | 49 | 35 | -53 |
| M+Y | 114 | 66 | 46 |
| C+Y | 128 | -74 | 27 |
| C+M+Y | 43 | 0 | -3 |

SUB-GROUPS

| | a* | b* |
|---|---|---|
| (m+y) | + | + |
| m,(c+m) | + | - |
| y,(c+y) | - | + |
| c | - | - |

COLOR ERROR DIFFUSION METHOD FOR MULTI-LEVEL OUTPUT DEVICE

BACKGROUND AND SUMMARY OF THE INVENTION

This invention relates to an improved color-image diffusion process for use in conjunction with the operation of a multi-level, halftone, color-image output device. In particular, it relates to such a process which uniquely links (a) a special, early-stage, output-device-dependent color error vector diffusion practice respecting input color-image data and utilizing a halftone, output-device-dependent color palette which contains output-device-dependent output color values, with (b) a later-stage procedure for applying a dot-gain correction curve regarding the infeed intensity value of a pixel which is to be supplied to the output device in preparation for image outputting. While different multi-level, halftone, color-image output devices may be employed in the practice of the invention, a preferred embodiment of, and manner of practicing, the invention, are described herein in conjunction with employing a C,M,Y,K print engine, or printer, with respect to which practice of the present invention has been found to offer particular utility.

In accordance with the invention, color image source pixel data, converted to an appropriate input color space which is a matter of the user choice—the L,a*,b* color space being chosen for illustration purposes herein—is subjected to a unique color error diffusion process which involves another color-space conversion to an output color space, and which is based, at least in part, upon the vector color distance between the input color-space values of a color-diffusion-error-corrected pixel, and the closest findable possible device output color as represented in a specially constructed bi-tonal (halftone) color palette of values. This color palette is uniquely arrived at through the process of averaging (a) measured image output-device color output values, with (b) user-selected, idealized color output values, to create an employable color palette which, while truly device-dependent in fundamental nature, has been adjusted through the mentioned averaging procedure to result in the outputting of halftone printed output image colors that are especially pleasing to the observer.

Another unique feature of the diffusion practice of the present invention, with respect to utilizing the values created for the averaged and just-mentioned color palette, is that the selection of color-space values for a pixel is made in a special prioritized manner which give determining weight, as will be explained, to the quadrant-related arithmetic signages which are linked with the two-dimensional chrominance values that are associated with related predecessor (input) pixel chrominance values and successor (output) pixel chrominance values.

Here is an illustration regarding how one can envision this practice. This illustration is one chosen for convenience in describing this practice of the invention, though it should be understood that other color space choices may be employed if desired.

In this illustration, source image data resides in R, G, B color space, and from this space, source color-image pixel data is first converted to L,a*,b* color space—the so-called input color space—wherein a* and b* are chrominance values which are two-dimensional in nature, and which are associated with arithmetic (+/−) signage that places these values in different color-space "quadrants". From an arithmetic signage point of view, these quadrants can be represented as: (+,+), (+,−), (−,+), and (−,−).

In the mentioned averaged color palette, L,a*,b* input color values are table-related to associated output C,M,Y, C+M, M+Y, C+Y, and C+M+Y output color values, When an input pixel's diffusion-corrected L,a*,b* values are color-distance compared with table L,a*,b* values for the purpose of selecting output values in the C,M,Y,K color space, a prioritizing algorithm is implemented in a manner which favors, first of all, a selection of C,M,Y,K values from that palette whose associated L,a*,b* values possess the same quadrant-associated chrominance arithmetic signage as that linked to the input pixel's chrominance signage.

Thus a (+, +) chrominance input pixel will result in priority selection, initially, of a C,M,Y,K output value whose associated a*,b* chrominance values reside in the (+, +) quadrant, a (−,+) chrominance input pixel will result in a C,M,Y,K output value having an association with the (−,+) quadrant; and so on. This approach, thus steers output selection to a particular limited range of choices in the palette, and results in a very pleasing color image output result from the employed output device.

With respect, therefore, to an output device such as the above-mentioned illustrative C,M,Y,K printer which will be discussed illustratively herein, the averaged color palette includes averaged values arrived at for the following colors, M,C,Y,C+M, M+Y, C+Y, and C+M+Y. Additionally, white and black (or C+M+Y, or K) values are useful to have in the palette, and so are effectively included. These white and black (or C+M+Y, or K) values are not specifically illustrated in the several color palettes shown in the drawings herein.

Following the event of priority-determined palette conversion of a color-diffusion-error-corrected pixel's values between the L,a*,b* and the C,M,Y,K color spaces, and before "submission" of a selected-value-set, halftoned output pixel to the color-image output device, an intensity correction, if needed, is applied through the use of an appropriately pre-created intensity correction curve, thus to minimize the problems associated with color-output dot gain.

The detailed description which follows below will more fully explain how color values intended to be sent to the output device are chosen using both the color-value palette and the practice of quadrant-based prioritizing just generally discussed.

As will become appreciated, the applications of these two uniquely linked stages of processing as just generally outlined (specialized and priority-weighted color error diffusion, and anti-dot-gain intensity correction) result in greatly improved and superior output device outputting of halftone color images. Very specifically, the stage of practice involving use of the mentioned color palette, and of arithmetic-signage quadrant weighting, coupled with the subsequent-stage process of dot-gain intensity correction, lead to a final output image which is extremely satisfactory.

These and other features and advantages which are attained by practice of the present invention will become more fully apparent as the detailed description which now follows is read in conjunction with the accompanying drawings.

DESCRIPTION OF THE DRAWINGS

Table". Very specifically, FIG. 2 illustrates the cooperative use, in accordance with practice of this invention, of a device-dependent color-space value palette with an organization of color subgroups based upon arithmetic plus and minus chrominance-value signage.

FIG. 6 illustrates a color-space value palette which is significantly device dependent, and which has been created on the basis of spectrophotometric measurements of output colors produced by a particular output device, such as a color printer.

FIG. 7 shows a color palette which is based upon subjectively chosen, idealized output color values.

FIG. 8 illustrates an averaged color palette which is based upon an averaging of the respectively associated L,a*,b* color values shown in FIGS. 6 and 7.

FIG. 9 is a table illustrating color subgroups based upon different quadrant-related patterns of chrominance-value arithmetic signage which play a role in the practice of the invention.

DETAILED DESCRIPTION OF THE INVENTION

Figure 1:
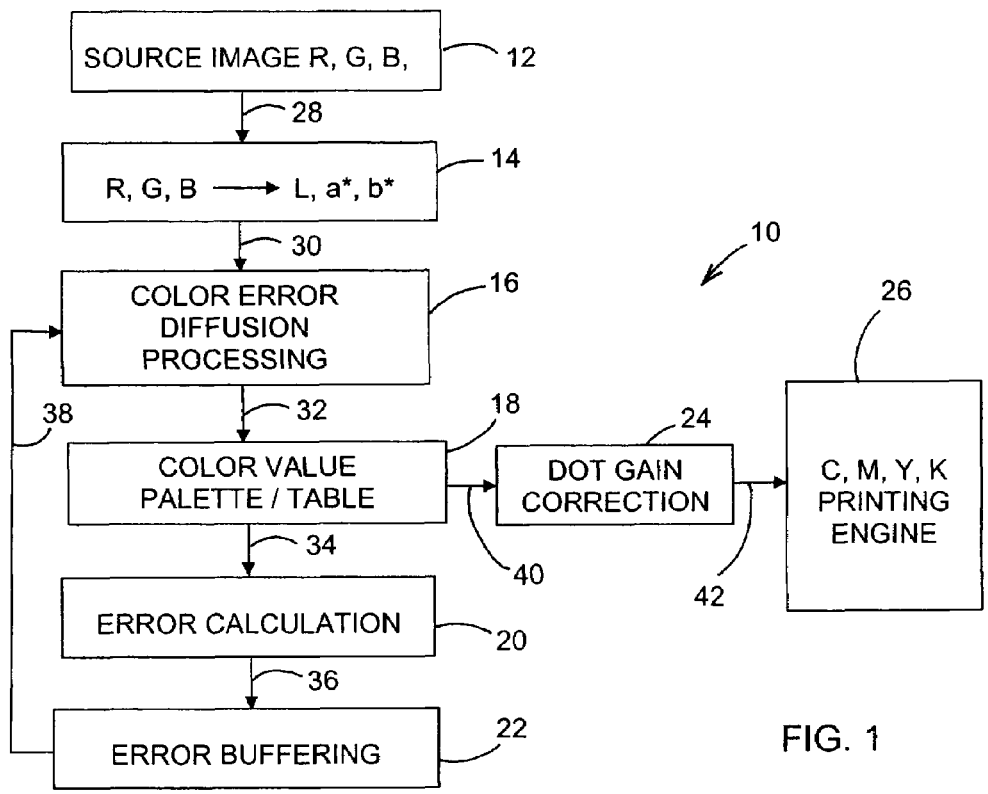
FIG. 1 is a block/schematic diagram illustrating, in an overall sense, implementation and practice of a preferred and best-mode implementation of the present invention.

Turning now to the drawings, and beginning with FIG. 1, indicated generally at 10 in this figure is a block/schematic diagram which pictures both the methodology and the structure (system) of the present invention—preferred embodiment and best mode. From a methodological point of view, the invention is also referred to herein as an improved color-image error diffusion practice which involves halftone diffusion error processing, coupled with steps of output color selection, which are based upon use of a specially designed halftone color palette to select output values for a pixel which is to be delivered to a multi-level, halftone, color-image output device. The invention also contemplates, as a part of its halftone-processing, color-palette activities, the use of priority weighting in the final selection of a halftone pixel output color, with such weighting being based upon chrominance arithmetic (+/−) signage, whereby output color selection is based upon the act of matching output-pixel chrominance signage with related input-pixel chrominance signage.

As was mentioned earlier herein, this embodiment of the invention is illustrated and described herein in the contexts of three different color spaces, including R,G,B color space for source image pixels, L,a*,b* color space for "input" color-image pixels, and C,M,Y,K color space for "output" color-image pixels.

Eight text-labeled blocks, 12, 14, 16, 18, 20, 22, 24, 26, appear in FIG. 1 to provide overall illustration of the invention. Arrow-headed, operative connection lines 28, 30, 32, 34, 36, 38, 40, 42 are shown interconnecting different pairs of these blocks.

In the practice of the invention, and describing now an overview of that practice, source image data in R,G,B color space (block 12) is supplied initially (line 28) for color-space conversion (block 14) to L,a*,b* color space, This converted data, which constitutes "input" pixel data, is supplied over line 30 to block 16, wherein halftone color-error-diffusion processing is performed, with diffusion-processed pixels then "flowing" over line 32 to a halftone color-value palette (block 18). It is within block 18 that L,a*,b* color-space pixels which are received by the block are (a) examined for their respective chrominance-value arithmetic signage, (b) compared thereafter with L,a*,b* values contained in the palette to identify a prioritized chrominance-value arithmetic signage match, and (c), then value-compared (color-distance calculation) with appropriate L,a*,b* palette-value entries so as to select the most appropriate C,M,Y,K color-space output pixel values. These output pixel values are then sent over line 40 to dot-gain correction block 24 for any needed intensity correction, and thence, as so corrected, are sent over line 42 to a multi-level, color-image, C,M,Y,K output device (here a printer) 26.

Also L,a*,b* palette values of a selected-color output pixel are sent from block 18 over line 34 to error calculation block 20. Error calculation for subsequent color error diffusion is performed conventionally in block 20, and resulting calculated error data is supplied over line 36 to error buffering block 22. Block 22 then makes available to block 16, via line 38, a "next" set of error values to be employed with the "next processed" input pixel.

Elaborating now on this just-given general invention overview, and beginning this discussion with the flow of color-diffusion-corrected L,a*,b* color-space pixels, as has been mentioned, the invention implements color error diffusion employing a specially generated, halftone, color-value palette. This palette functions somewhat in the manner of a look-up table which correlates input-color-space L,a*, b* pixel values with C,M,Y, C+M, C+Y, M+Y and C+M+Y device output-color-space values based upon an average of spectrophotometrically measured color output values resulting from the actual printing performance of a selected output device with subjectively determined (in any suitable manner) idealized (or ideal) output-color-space-values. FIGS. 6 (Measured), 7 (Ideal) and 8 (Averaged) collectively illustrate this unique concept of the present invention. The palette shown in FIG. 6 is designated 44; that shown in FIG. 7 is designated 46; and that shown in FIG. 8 is designated 48.

With regard to the spectrophotometrically measured palette values, C,M,Y,K printer 26, the output device illustrated herein, is operated to print both a collection of primary C,M,Y color patches, and a collection of secondary C+M, C+Y, M+Y, and C+M+Y color patches. When this has been done, a spectrophotometer reads these color patches, and from that reading, effectively outputs the respective L,a*,b* pixel color values for each of the patches. These performance-measured L,a*,b* color values, appropriately "adjusted" to lie within a scale of values ranging from 0 to 100, which range relates proportionately to a "computer" range 0 to 255, then make up the bulk of the mentioned color-value palette which is shown in FIG. 6. A "white" set, and a black (or C+M+Y, or K) set, of values are also included in the palette. As was mentioned earlier, these white and black, etc. values are not specifically incorporated into the drawings herein.

Employing then any user-desired subjective approach, what is referred to herein as an "ideal" relational (L,a*,b* to C,M,Y,K) color palette is created, and such a palette is shown in FIG. 7. Mathematical averaging is thereafter performed to create the intended "averaged" color palette which is pictured in FIG. 8. It is this averaged color palette, prepared as just described in accordance with a unique practice of the invention, which is employed in block 18 as a part of the halftone color error diffusion practice of the invention.

Figure 2:
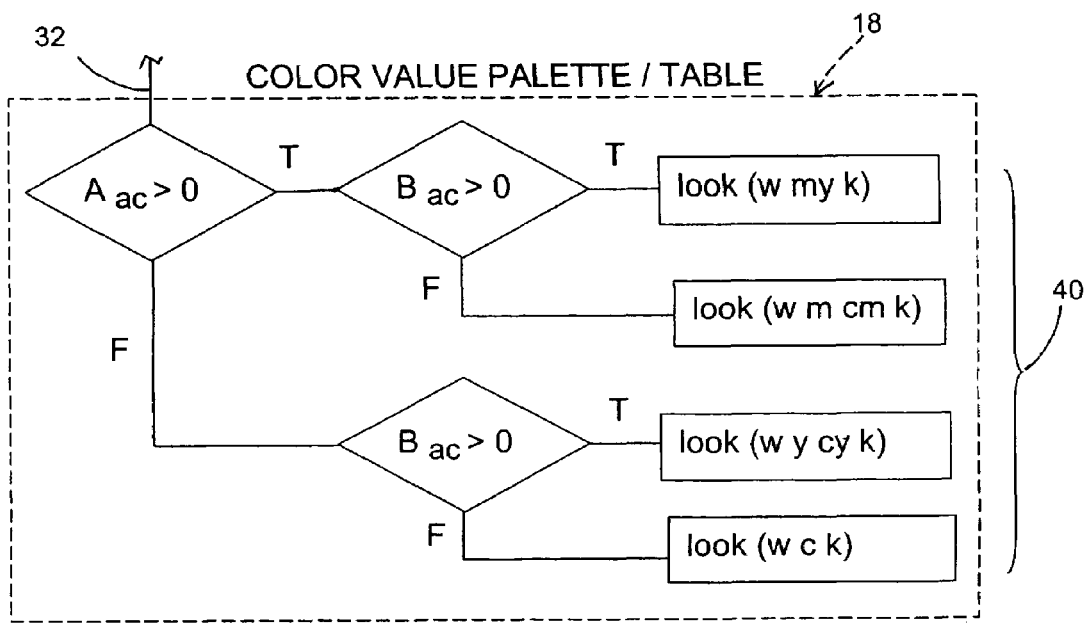
FIG. 2 is a block/schematic diagram further detailing the block in FIG. 1 which is labeled "Color Value Palette/

As was also mentioned earlier herein, immediately prior to direct use of palette 48 in block 18, an algorithm is applied to implement the previously discussed weighted prioritizing which takes place, based upon comparative, pixel-chrominance-value, arithmetic signage, to "steer" the use of palette 48. FIGS. 2 and 9 (see "Sub-Group" table 49 in this figure) illustrate this algorithm.

Looking, with reference to these to figures, for example, at the a*,b* chrominance values presented in palette 48 in FIG. 8, one can see that the output color M+Y is related to the (+,+) quadrant (explained above), that output colors M and C+M are related to the (+,−) quadrant, that the colors Y and C+Y are related to the (−,+) quadrant, and that the output color C is related to the (−,−) quadrant. In the use if this quadrant-based (in two-dimensional chrominance space) algorithmic approach, according to preferred practice of the invention, (+) means greater than 0, and (−) means not greater than 0.

An input L,a*,b* color space pixel presented to block 18 is first subjected to the mentioned algorithm which is diagrammed in FIG. 2. Here, one can clearly see how subsequent usage of palette 48 is "steered" by this alg An input pixel with two-dimensional color-chrominance values lying in the (+,+) quadrant will be steered for color-distance examination to the palette colors white, M+Y, and black (or C+M+Y, or K). One with chrominance values lying in the (+,−) quadrant will be steered to the palette colors white, M, C+M, and black (or C+M+Y, or K). A pixel with a*, b* chrominance values lying in the (−,+) quadrant will be steered to the colors white, Y, C+Y, and (black or C+M+Y, or K). And an input pixel characterized in the (−,−) quadrant will be steered to the colors white, C, and black or (C+M+Y, or K).

Once this algorithmic "steerage" has taken place, and with regard, then, to a pixel whose L,a*,b* values are now presented to palette 48, a vector comparison is performed to determine which of the color values existing in the "steered-to" palette values possess the "closest distance" (a vector difference) to the presented-pixel's color values. The well-known equation for determining this distance is:

$$\Delta E = [\Delta L^2 + \Delta a^2 + \Delta b^2]^{1/2}$$

Whichever set of L,a*,b* color values is found to resolve this closest-distance question determines the color of the pixel which will be output (delivered) to block 24 via line 40. Thus, if a C-color pixel has the determined "closest-distance" characteristic, a C-color pixel will be so output. If a C+M color pixel has the determined closest distance characteristic, a C+M color pixel will be output to block 24, and so on.

This process herein of outputting, or delivering, from block 18 a pixel having exactly the color values only, essentially, of one of the C,M,Y,K primary or secondary colors that are producible ultimately by halftone printer 26, as such values are contained in palette 48, is a principal contributor in the invention to the avoidance of using the prior-art practice of pixel-value interpolation.

As a consequence of such pixel outputting from block 18, based upon the comparison activity that takes place in palette 48, processing for future color-diffusion error processing is handed off, via line 34, to block 20, wherein a related new color diffusion error calculation is performed. This calculation is conducted in relation to the L,a*,b* value differences which differentiate the L,a*,b* values of the actual output (from block 18) pixel values from those of the input pixel whose values triggered the palette-48 comparison in the first place. A new color-diffusion error determination is then stored, via line 36, in error buffering block 22.

The following descriptive narrative further illustrates, in an example, the above-discussed procedures (post application of the arithmetic "steering algorithm") for employing palette 48, and for calculating accumulated color diffusion error for subsequent diffusion processing.

In palette 48, C has the L,a*,b* values of 146, −26, −47. If a pixel presented to this palette has the value 142, −23, −49, such a pixel will have a determined "closest distance" to the C values. As a consequence, a C pixel will be output ultimately to printer 26. Outputting of this C pixel causes an "expenditure" of color values 146, −26, −47. To calculate (in block 20) the error which this expenditure creates, the "spent" color values are subtracted from "presented-pixel" color values. Thus the error which will result from this event will be −4, 3,−2. This error result will be supplied to error buffering block 22 for next use with a subsequently processed pixel.

Figure 3:
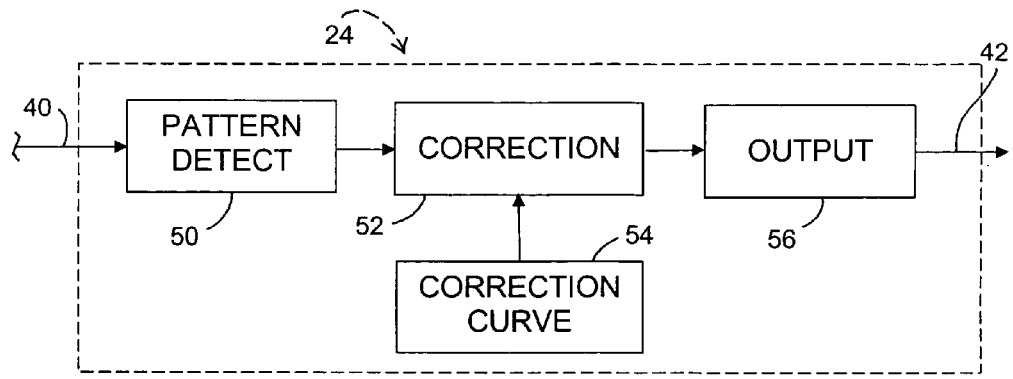
FIG. 3 is a block/schematic diagram further illustrating the block in FIG. 1 which is labeled "Dot Gain Correction".
Figure 4:
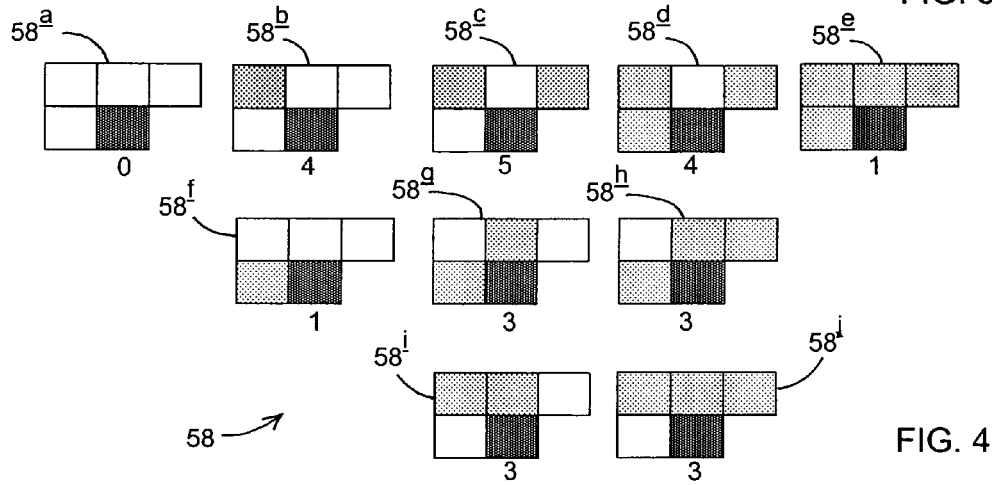
FIG. 4 shows an array of pixel patterns that are related to the creation and subsequent use of a dot-gain correction curve which is applied to control infeed intensities of pixels fed to a multi-level color-image halftone output device, such as a color printer.
Figure 5:
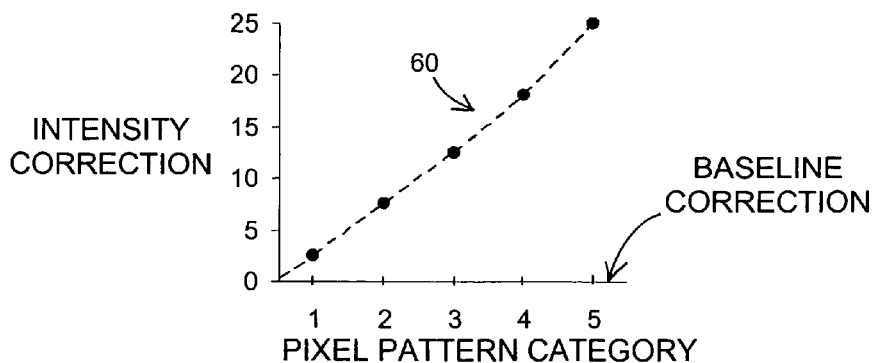
FIG. 5 illustrates a single-output-color, dot-gain correction curve based upon the pixel patterns illustrated in FIG. 4.

Retuning description now to the flow of pixel data over line 40 to block 24, FIGS. 3-5, inclusive, detail what is present, and what takes place, here. FIG. 3 illustrates generally in four sub-blocks 50, 52, 54, 56 both the structure and the methodological architecture of block 24. These sub-blocks are, respectively, a pattern detection sub-block 50, a correction sub-block 52, an available correction curve sub-block 54, and an output sub-block 56.

For illustration purposes herein, sub-block 50 examines for "arriving pixel" for its association with any one of the eleven pixel patterns which are shown generally collectively at 58 in FIG. 4, and individually at 58a-58k, inclusive, in this figure.

Sub-block 54 contains, as will shortly be described, a collection of intensity correction curves, such as the one shown generally at 60 in FIG. 5. One will note in FIG. 4 that the eleven pixel patterns illustrated there are also labeled into six different categories—0, 1, 2, 3, 4 and 5. These categories describe what can be thought of as a hierarchy of levels of contribution to dot gain, with category 0 contributing the lowest "level", and category 5 contributing the highest "level". The correction curve shown illustratively in FIG. 5 is defined by six data points, 60a-60f, inclusive, which, on the X-Y axes pictured there (Intensity Correction vs. Pixel Pattern Category), are related, respectively to pattern categories 0-5, respectively.

The practice of dot-gain intensity correction which is implemented by the invention in block 24 forms a special and unique collaborative co-performer with the halftone color-error-diffusion practice carried out as previously described.

By way of modest background regarding so-called dot gain, it is typical for dot gain to become a problem in an imaging, or printing, system wherein an output color image is to be delivered as a halftoned color image. Generally speaking, and as it will be understood by those skilled in the art, such dot gain typically has two different aspects, one of which is referred to as physical dot gain and the other of which is referred to as optical dot gain. The practice implemented in block 24 by the present invention utilizes a unique methodology for reducing, significantly, both categories of dot gain, in an output-device-specific manner, and in particular with respect to an output device, such as a printer, which is capable of outputting, in a multi-level manner, a halftoned color image.

According to this practice, for each output color in a halftone mode which an image output device is capable of delivering, a special dot-gain intensity correction curve (one is represented in FIG. 5) is generated to control, effectively, the infeed intensity (infeed to the output device) of each pixel in a halftoned, device-infeed pixel data stream. The mentioned pixel infeed intensity correction curve employed by the present invention is prepared, with respect to a specific color-image output device, by causing that device, in what can be thought of as a calibrating mode, to output, for each of its operative colors, selected halftone dot patterns (those eleven patterns shown in FIG. 4) which are then individually examined for the purpose of determining what kind of a multi-level pixel infeed intensity control needs to be applied to cause an output color image, which is halftoned, to appear substantially without any appreciable dot-gain problems. How this device-specific calibrating activity takes place is described now in detail below.

Turning attention for a moment to FIG. 4, the eleven different five-pixel-member pixel patterns 58*a*-58*k* which are organized into six different categories are arranged, as can be seen, in a kind of flattened, L-shaped configuration, with each pattern including what will be referred to herein as a "central" pixel, darkened for emphasis. These patterns, which have the mentioned L-shaped configuration so as to be easily handled in a two-scan-line conventional data buffer, effectively represent all halftone pixel patterns which will be output by printer 26, in each of its CMYK colors, for every halftone output color image which is output by the printer. With this configuration, and in such a buffer, pattern examination can easily occur in a manner involving "taking a look" at the "central" pixel's four neighbors in the relevant pattern. As can be seen, categories 0, 2 and 5 each includes only a single pixel pattern, categories 1 and 4 each includes two pixel patterns, and category 3 includes four pixel patterns.

The eleven specific pixel patterns which are shown in FIG. 4 are employed, in accordance with practice of the present invention and as will now be described, to create a dot-gain, pixel infeed-intensity correction curve, such as curve 60 in FIG. 5.

To generate the needed correction curves, each one of the pixel patterns pictured in FIG. 4 is selected, one after another, at a "foundation level" of creating a dot-gain correction curve for use with practice of the present invention. On a color-by-color basis, of each one of the four, primary C,M,Y,K output colors that can be output by printer 26 is selected, and an appropriate printing instruction is given to the printer to print individually selected patterns 58*a*-58*k* in these individually selected colors.

Specifically, with such a selected pattern and a selected color chosen, the printer is given a command to print in a field, and at a user-choosable "intensity" level, the particular selected pattern in the particular selected color. The field so printed is one which contains only pixels that lie as "central" pixels within the particular selected pattern. The intensity chosen for this printing operation is that which is as high as possible without causing the problem known conventionally to those skilled in the art as "pollution".

With such a field of like pixel patterns so printed, a conventional densitometer is employed to "observe" the printed field, and to make a determination about the densitometer-perceived measurable percentage of "area coverage" which is created in the field. This measured percentage of coverage is compared with the "idealized" percentage of coverage which is, of course, directly determinable from the "geometric" nature of the particular pattern which has been selected for printing. When a densitometer reading is taken then which detects any difference in densitometer-perceived coverage, the difference between the perceived coverage and the idealized coverage is utilized, as will now be explained, to create a data point useable in the generation of the desired dot-gain pixel-infeed intensity-correction curve. In most cases, densitometer-perceived percentages of coverage will exceed related, idealized percentages of coverage.

After initial densitometer measurement and percentage-of-coverage comparison, the infeed pixel intensity to multi-level printer 26 is appropriately adjusted, and reprinting of the same pixel pattern in a field takes place, and this process is repeated enough times until one finally arrives at a condition where the densitometer reading matches the idealized percentage of coverage. The amount of pixel infeed intensity adjustment, or change, thus required to cause printer 26 to print a selected pixel pattern in a selected C,M,Y,K color so that a densitometer reading of area coverage matches that of idealized coverage, defines an intensity-correction amount which will then be associated in a correction curve for that selected color with respect to every output-device pixel which is the "central" pixel in the same-category pixel pattern.

This "calibration" process is repeated for each and every one of the eleven pixel patterns described herein, and (with respect to each such pattern) for each one of the four C,M,Y,K primary colors associated with printer 26. A plot of resulting data points, such as that which is shown at 60 in FIG. 5, is created to be employed thereafter for pixel input-intensity correction, thus to reduce and minimize the problem of dot gain thereafter in the operation of printer 26. In the specific illustration now being given, where there are four primary output colors and eleven pixel patterns, there will be forty-four correction curves.

Looking specifically at FIG. 5, here, on the illustrated X and Y axes, there is a plot, or curve, 60 (as mentioned) of required input pixel intensity correction versus pixel pattern category. The several obvious data points (six of them) which lie along curve 60 in FIG. 5 represent, for a given printer output color, a curve of pixel input-intensity correction which is required to deal with dot gain. The six (pattern-related) data points which define curve 60 in FIG. 5 represent Δ-corrections which are combined with a baseline correction which is shown in FIG. 5 by the X axis which is labeled "Baseline Correction". The baseline correction that is applied for all pixel patterns is determined essentially by the correction required for that pattern which needs the least amount of correction.

With all appropriate intensity-reduction curves thus created for a given halftone, multi-level, color-image output device, such as for printer 26, a system employing that output device is appropriately instructed (a) to observe the specific pattern within which, as a central pixel, each color pixel which is to be output by the device lies (sub-block 50), and (b), with this determination made, the appropriate correction is called in from the appropriate correction curve (sub-block 54 in FIG. 3), and (c) an input intensity correction as needed for that pixel in the output device in order to effect the desired dot-gain reduction is performed.

Thus, while a preferred and best-mode manner of practicing the invention have been described, and certain variations and modifications mentioned, it is appreciated that other variations and modifications may be made without departing from the spirit of the invention.

I claim:

1. An improved color-image error diffusion process for use in conjunction with the operation of a multi-level, halftone, color-image output device comprising performing output-device-dependent color error diffusion on color-image input data utilizing a halftone, output-device-dependent color palette containing output-device-dependent output color values which are based upon compromise values that are determined, colorfor-color, by a method involving averaging of (a) measured device output color values with (b) subjectively chosen color output values, and with respect to the selection for pixel outputting of a pixel utilizing one of the output colors in the palette, and in relation to infeeding of that pixel to the output device for outputting, applying a predetermined, dot-gain correction curve which corrects the infeed intensity value of the pixel in accordance with (a) selected output color for the pixel, and (b) assessment of the pixel in terms of its association with a predetermined neighborhood pattern of adjacent pixels.

2. The process of claim 1, wherein said performing, with regard to pixel output color selection, is more specifically conducted utilizing selected arithmetic (plus/minus) sign weighting in relation to the positive and negative color chrominance values associated with each pixel which is to be output.

3. The process of claim 1, wherein said performing, with regard to pixel output color selection, is more specifically conducted utilizing selected arithmetic (plus/minus) sign weighting in relation to the positive and negative color chrominance values associated with each pixel which is to be output.

4. An improved color-image error diffusion process for use in conjunction with the operation of a multi-level, halftone, color-image output device comprising performing output-device-dependent color error diffusion on color-image input data utilizing a halftone, output-device-dependent color palette containing output-device-dependent output color values, said performing involving effecting a color-space conversion of predecessor input color-image pixel data from one color space which is characterized by two-dimensional chrominance space with arithmetically-signed pixel chrominance values distributed in different quadrants, depending on signage, in that one color space, to another color space which is also characterized by two-dimensional chrominance space, and wherein pixel chrominance values are also arithmetically-signed and distributed in different quadrants, also depending on arithmetic signage, in that other color space, and wherein, further, the selection of successor output pixel color values resulting from said performing is based upon a same-quadrant priority approach which favors the selection of specific output pixel values having two-dimensional chrominance arithmetic signage that matches the related two-dimensional chrominance arithmetic signage which is associated with the predecessor input pixel chrominance-value signage, and with respect to the selection for pixel outputting of a pixel utilizing one of the output colors in the palette, and in relation to infeeding of that pixel to the output device for outputting, applying a predetermined, dot-gain correction curve which corrects the infeed intensity value of the pixel in accordance with (a) selected output color for the pixel, and (b) assessment of the pixel in terms of its association with a predetermined neighborhood pattern of adjacent pixels.

5. The process of claim 4, wherein said performing is conducted in relation to a palette whose color values are based upon compromise values that are determined, color-for-color, by a method involving averaging of (a) measured device output color values with (b) subjectively chosen color output values.

* * * * *